United States Patent
Cherian et al.

(10) Patent No.: US 7,797,501 B2
(45) Date of Patent: Sep. 14, 2010

(54) INFORMATION HANDLING SYSTEM INCLUDING A LOGICAL VOLUME AND A CACHE AND A METHOD OF USING THE SAME

(75) Inventors: Jacob Cherian, Austin, TX (US); Marcelo D. Vinante, Round Rock, TX (US); Douglas Huang, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 426 days.

(21) Appl. No.: 11/939,801

(22) Filed: Nov. 14, 2007

(65) Prior Publication Data

US 2009/0125676 A1      May 14, 2009

(51) Int. Cl.
*G06F 12/00*      (2006.01)
(52) U.S. Cl. .................. 711/162; 711/114; 711/118; 711/161; 711/170; 711/E12.017
(58) Field of Classification Search .................. None
See application file for complete search history.

(56) References Cited

U.S. PATENT DOCUMENTS

| 6,148,377 | A * | 11/2000 | Carter et al. ............. 711/147 |
|---|---|---|---|
| 6,301,574 | B1 | 10/2001 | Thomas et al. |
| 6,636,857 | B2 | 10/2003 | Thomas et al. |
| 6,732,290 | B1 | 5/2004 | Perry et al. |
| 6,851,071 | B2 | 2/2005 | Bossen et al. |
| 6,981,114 | B1 * | 12/2005 | Wu et al. ..................... 711/162 |
| 2002/0007438 | A1 | 1/2002 | Lee |
| 2003/0154199 | A1 | 8/2003 | Thomas et al. |
| 2003/0217042 | A1 | 11/2003 | Thomas et al. |
| 2004/0179386 | A1 * | 9/2004 | Jun ............................ 365/145 |
| 2006/0112302 | A1 | 5/2006 | Cherian |
| 2006/0224823 | A1 | 10/2006 | Morley et al. |
| 2006/0236149 | A1 | 10/2006 | Nguyen et al. |
| 2007/0067667 | A1 | 3/2007 | Ikeuchi et al. |

* cited by examiner

*Primary Examiner*—Shawn X Gu
(74) *Attorney, Agent, or Firm*—Larson Newman & Abel, LLP (57) ABSTRACT

A system and method of recovering cached data can be used when a particular physical storage device becomes unsuitable for storing data. In one aspect, the method can include providing the information handling system including a logical volume and a cache. The cache includes data that is to be stored within a particular physical storage device. The method can also include persisting the data within a different physical storage device. In one embodiment, the different physical storage device can be used to temporarily store the data when a logical volume is inaccessible. After the particular physical storage device becomes suitable to persist the data, the logical volume can be restored. The method can further include persisting the data within the particular or a replacement physical storage device. In another aspect, a system can be configured to carry out the methods described herein.

13 Claims, 3 Drawing Sheets

INFORMATION HANDLING SYSTEM INCLUDING A LOGICAL VOLUME AND A CACHE AND A METHOD OF USING THE SAME

FIELD OF THE DISCLOSURE

This disclosure relates generally to information handling systems, and more particularly to information handling systems including logical volumes and caches and methods of using the same.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

The present disclosure may be better understood, and its numerous features and advantages made apparent to those skilled in the art by referencing the accompanying drawings.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

An information handling system can include a logical volume that is more fault and error tolerant. Data may reside within a cache of the information handling system. As used herein, data refers to a combination of actual data and their corresponding metadata. For example, the actual data can include a word processing document, and the corresponding metadata can include the location where the actual data is or is to be persisted and the size of the actual data. In one embodiment, the actual data may be intended to be persisted within a particular storage device of the logical volume. During operation of the information handling system, the logical volume may become inaccessible. For example, the particular storage device within the logical volume may have become unable to store the data in the cache, thus rendering the logical volume inaccessible. As used herein, inaccessible and its variants are to be construed broadly to include physical impossibility (e.g., no power or no network connection any part of the logical volume), marginal accessibility to the logical volume (e.g., a poor quality or intermittent connection to or within the logical volume), another situation that renders the logical volume inaccessible from a practical standpoint, or the like.

A method can include retaining the data within the cache or persisting the data (e.g., actual data and their corresponding metadata) in one or more different storage devices within the logical volume while the logical volume is inaccessible. The corresponding metadata can include information regarding the logical block address, the particular storage device where the actual data were to be persisted, and the different storage device(s) where the actual data are being persisted. After the logical volume becomes accessible, the logical volume can be restored. The data can be restored to the cache, and the actual data can then be persisted within the particular storage device (in which the actual data were intended) or a replacement storage device. Corresponding metadata, reflecting that the actual data has been persisted, can be persisted within the metadata portions of the storage devices within the logical volume.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices, as well as various input and output (I/O) devices, such as a keyboard, a mouse, and a video display. The information handling system can also include one or more buses operable to transmit communications between the various hardware components.

According to one aspect of the disclosure, an information handling system can include a logical volume and a cache, wherein the logical volume includes a first storage device and a second storage device, and the cache includes data that is to be persisted within the first storage device. A method of storing data within the information handling system can include providing the information handling system that includes a logical volume and a cache, wherein the logical volume includes a first storage device and a second storage device, and the cache includes actual data that is to be persisted within the first storage device. The method can also include persisting the actual data within the second storage device that is different from the first storage device. The method can further include persisting the actual data within a third storage device after persisting the actual data within the second storage device, wherein the third storage device is part of the logical volume and is different from the second storage device.

According to another aspect of the disclosure, an information handling system can include a logical volume including a first storage device and a second storage device that is different from the first storage device, and a cache operable to temporarily store data that is to be persisted within the first storage device of the logical volume. The information handling system can also include a processor coupled to the logical volume and the cache, wherein the processor is operable to store the data into the cache, determine whether the logical volume is inaccessible, persist the data into the second storage device in response to detecting that the logical volume is inaccessible, and restore the logical volume.

Figure 1:
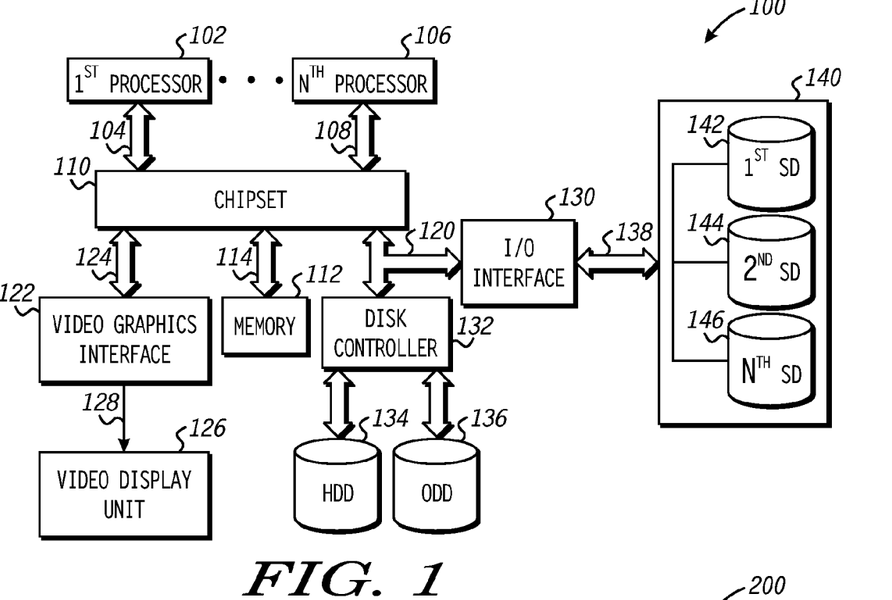
FIG. 1 includes a block diagram of an information handling system according to an aspect of the disclosure.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110 including an AHA enabled-chipset can include a memory controller hub and an I/O controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can be generally considered an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 Mhz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle input/output (I/O) functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

The information handling system 100 can also include the I/O interface 130 operably coupled to an external communication bus operable to handle I/O requests for one or more storage devices, such as an external storage device, and internal storage device, or any combination thereof. In one form, the I/O interface 130 can be coupled to an array of storage devices 140 that can include a first storage drive 142, a second storage drive 144, and up to an $n^{th}$ storage drive 146. In one form, the I/O interface 130 can include a logical volume manager module operable to manage access to the first storage drive 142, the second storage drive 144, and the $n^{th}$ storage drive 146 as a single logical volume. As such, the array of storage devices 140 can be provided as a single logical volume or can be provided as multiple volumes as desired. The external bus 138 can include various types of data buses or links including, but not limited to, SCSI, Serial Attached SCSI, Advanced Technology Attachment (ATA), Serial ATA (SATA), or any combination thereof. Additionally, the I/O interface 130 can include logic to control the external drives based on I/O requests made to the external drives, and in some instances, can be used to reduce power outputs for one or more external storage device. In one form, an external storage device can include one or more disk drive, hard disk drive, tape drive, optical drive, flash memory drive, holographic drive, or any combination thereof.

During operation, the I/O interface 130 can be used to measure the amount of I/O requests (e.g., read/write requests) made to an external drive over a period of time. For example, the I/O interface 130 can initiate a command to alter an operating mode or state of one or more storage device based on the frequency of I/O requests made. For example, if an I/O request is not made over an interval of time (e.g., 30 seconds, 1 minute, 5 minutes, etc.), the I/O interface 130 can communicate a command to alter the operating mode of the storage device. For example, the I/O interface 130 can communicate a command to spin down, or place a storage device in a standby mode. According to one aspect, the interval of time can be configurable, or in other embodiments, can be preset to a specific value.

In one embodiment, the storage devices coupled to the I/O interface 130 can be provided as a single volume or multiple volumes. As such, the I/O interface 130 can initiate a command to place each storage device associated with a specific volume in reduced operating state when not being accessed. In one form, first storage device 142 and second storage device 144 may be viewed as a single logical volume or virtual disk (VD) and may be used to process I/O requests. In one form, a logical volume can include a VD, a combination of VDs, or various other physical disks that can be used in association with a VD. Additionally, a VD can include one or more logical volumes as desired. In yet another form, a logical volume can also be considered a VD.

According to one aspect, an I/O request received by the I/O interface 130 may initiate access to information stored only on the first physical storage device 142 and not the second physical storage device 144. As such, the I/O interface 130 may present the first physical storage device 142 and the second physical storage device 144 as a part of the logical volume or VD 140, and the I/O interface 130 can manage access to each of the physical storage devices. Additionally, the I/O interface 130 can detect when access to a specific physical storage device is requested and alter the operating state of the physical storage device as desired. In this manner, portions of a logical volume or VD can be accessed while other portions of the logical volume can be placed in a reduced power state thereby reducing the overall power consumption of a logical volume or VD for information handling system 100.

In one form, altering an operating state can include providing a reduced power state. For example a reduced power state can include placing a physical storage device in state that consumes less power than when fully operational. For example, the first physical storage device 140 can be provided as an external disk drive that can be slowed or stopped in association with a reduced power state. Additionally, logic operably associated with the external disk drive may remain active to detect inputs from the I/O interface 130. For example, the external disk drive can include sufficient operational logic to process inputs provided by the I/O interface 130 such as non-media or drive access commands. In this manner, the I/O interface 130 can issue a command to return an external drive to an active operating state to allow access to content stored within the external disk drive in response to a request being received.

In another form, the information handling system 100 can issue an I/O request to the I/O interface 130, and the I/O interface 130 can request a physical storage device to be placed in an active operating state to satisfy the I/O request provided by the information handling system 100. According to one aspect, the I/O interface 130 can issue a busy signal or other delay signal to the information handling system 100 until the physical storage device can service the I/O request.

According to another aspect, the I/O interface 130 can include a memory, cache, buffer, or other memory operable to store information associated with I/O requests. For example, if the information handling system 100 receives a read request for information stored within a specific volume, the I/O interface 130 can access a memory buffer to determine if the I/O request can be satisfied using contents or information stored within the memory buffer. In another embodiment, if the information handling system 100 makes a write request to one or more of the physical storage devices, the I/O interface 130 can place the information to be written within the memory buffer, and upon the external drive becoming available, the contents of the memory can be written to the appropriate physical storage device as desired. As such, by providing physical storage devices having modifiable operating states that can be altered based on I/O requests of an information handling system over an interval of time, a reduction in power consumption of one or physical storage devices can be provided to reduce the overall amount of power dissipated by the physical storage device, and potentially reducing cooling that may be required.

Figure 2:
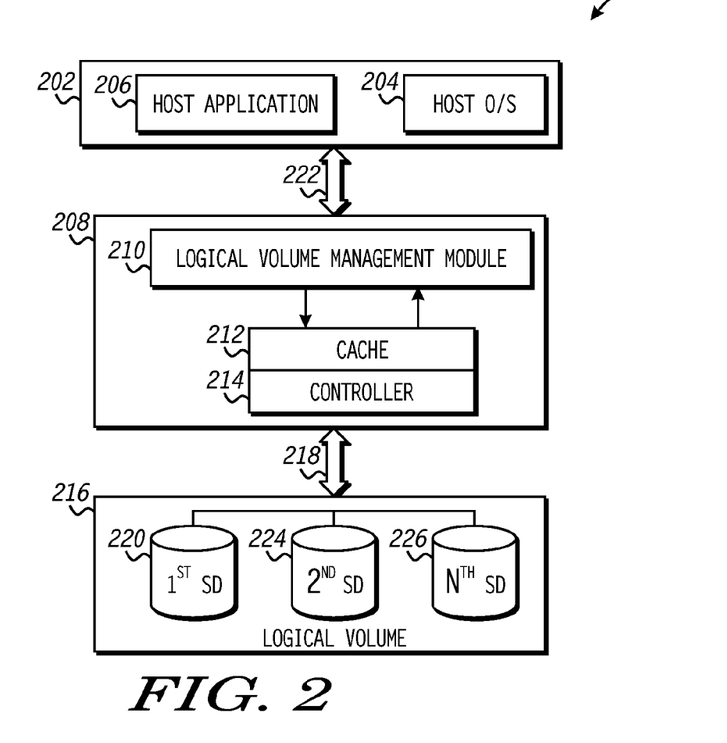
FIG. 2 includes a functional block diagram of a system to carry out a data recovery operation in response to a logical volume error in accordance with another aspect of the disclosure.

FIG. 2 illustrates a functional block diagram of a system 200 used to store data within a cache and persist the data within a logical volume that includes physical storage devices. The information handling system 200 can be employed, in whole or in part, by the information handling system 100 illustrated in FIG. 1, or any other type of system than can be used to provide the information handling system 200.

The information handling system 200 can include a host system 202 including a host operating system (O/S) 204 and a host application 206. In one form, the host system 202 can include the information handling system 100 illustrated in FIG. 1. The information handling system 200 can also include an I/O interface 208 that can include a logical volume memory (LVM) module 210, a cache 212, and a controller 214. The I/O interface 208 can be coupled to the host system 202 via a host communication link 222 and can be operable to access one or more logical volume, such as logical volume 216, coupled to the I/O interface 208 using a volume communication link 218. In one form, the host communication link 222 or the volume communication link 218, or any combination thereof, can be operable using ATA, SATA, SCSI, Serial Attached SCSI, Ethernet, or various other types of communication links or communication mediums that can be used to access a logical volume, VD, physical storage device, or various other types of devices or virtual devices that may be employed by the information handling system 200.

In one form, the I/O interface 208 can be operable to access a first physical storage device 220, a second physical storage device 224, and an $n^{th}$ physical storage device 226. In one form, the logical volume 216 can be provided as a single logical volume as illustrated in FIG. 2 or can be provided as multiple logical volumes (not illustrated). Additionally, one or more of the physical storage devices of the logical volume 216 can be used with an additional logical volume. Additionally, a logical volume can also be viewed as a logical unit, virtual disk, or various other forms, operable to be presented as a logical storage resource to an information handling system. For example, an information handling system can view the logical volume 216 as a single logical volume and the I/O interface 208 can present the information handling system as such. The LVM module 210 can manage access to a specific drive within the logical volume 216. However in other forms, access can be managed by a controller associated with a single logical volume or physical storage device.

According to another aspect, the information handling system 200 and the I/O interface 208 can be provided as a part of the host system 202. In one form, the information handling system 200 can be a Just a Bunch of Disks (JBOD) system. In another embodiment, the I/O interface 208 or portions thereof can be provided as a part of the logical volume 216, and associated controllers can also be provided. For example, the logical volume 216 can include a Redundant Array of Inexpensive Disks (RAID) controller for controlling access to each physical storage device for processing I/O requests. The RAID controller can also include the logic to provide the I/O interface 208. In another form, the I/O interface 208 can include a SCSI enclosure processor (SEP) operable to house one or more physical storage devices and provide output power, diagnostic support, environmental control, and various other functions for a physical storage device. According to one aspect, a SEP can include one or more array elements and associated status circuits for managing and outputting visual indicators of an operating status of one or more physical storage devices.

The information handling system 200 includes a processor that is operable to generate metadata corresponding to actual data, associate the actual data with their corresponding metadata, read the actual data and their corresponding metadata from and store the data and their corresponding metadata into the cache 212, read the actual data and their corresponding metadata from and persist the actual data and their corresponding metadata within physical storage devices within the logical volume 216, carry out any operation as described herein, or any combination thereof. The processor can be part of the host system 202, the I/O interface 208, or a collection of circuits that are distributed within different parts of the host system 202 and the I/O interface 208.

The cache 212 can include a temporary memory that may include volatile memory. The cache 212 can be in the form of a memory module (e.g., a single inline memory module, a dual inline memory module, or any combination thereof), a standalone integrated circuit, or other suitable form. The logical volume 216 includes persistent memory that has a substantially larger memory capacity as compared to the cache 212. In one embodiment, the memory capacity of the logical volume 216 is at least 100 times, at least 1000 times, or at least 10,000 times larger than the memory capacity of the cache 212. In another embodiment, the difference in memory capacities between the logical volume 216 and cache 212 may be smaller. In a particular embodiment, the cache 212 has a memory capacity of no greater than 1 gigabyte, and the logical volume 216 has a memory capacity of at least 1 terabyte. In other embodiments, other combinations of memory capacities can be used.

The logical volume 216 can include substantially all or portions of physical storage devices 220, 224, and 226. Within the logical volume 216, the physical storage devices can include hard disk drives, floppy disk drives, a nonvolatile memory stick (e.g., USB memory stick), other persistent physical memory, or any combination thereof. Within each physical storage device, a main portion of the physical storage device is used to persist actual data (e.g., documents, spreadsheets, pictures, or the like). The actual data can have a size corresponding to a stripe, a line, a block, or another unit of memory.

Each physical storage device can also include one or more reserved portions that are not used to persist actual data when the logical volume is accessible. In one embodiment, the reserved portion can be a metadata portion. The metadata portion can include metadata corresponding to actual data within the logical volume. In a particular embodiment, the metadata has information regarding where any and all actual data within the logical volume is physically located or is to be physically located. Thus, the metadata portion of a particular physical storage device within a logical volume can have not only the metadata for actual data associated with that particular physical storage device but can also have the metadata for actual data associated with other physical storage device(s) within the logical volume. The metadata can include other information, including a pointer or an address to a particular block or sector of the particular physical storage device, the size of the data, other suitable information or the like. In a particular embodiment, metadata for all of the data within the logical volume 216 can be persisted in the metadata portion of each physical storage device 220, 224, and 226 within the logical volume 216.

In another embodiment, the reserved portion can be a data recovery portion. In still another embodiment, the data recovery portion can be created for recovering data for the logical volume from the cache when the logical volume becomes inaccessible. Thus, a data recovery portion of a physical storage device can be dedicated for data recovery methods as described herein. In yet another embodiment, physical storage devices can include other types of reserved portions if needed or desired.

While the logical volume 216 is accessible, the actual data is persisted within the particular main portion of the particular physical storage device 220, 224, or 226, and the corresponding metadata is stored within each of the metadata portions of the physical storage devices 220, 224, and 226. The actual data can be provided to the I/O interface 208 and to the host system 202 as needed or requested.

Figure 3:
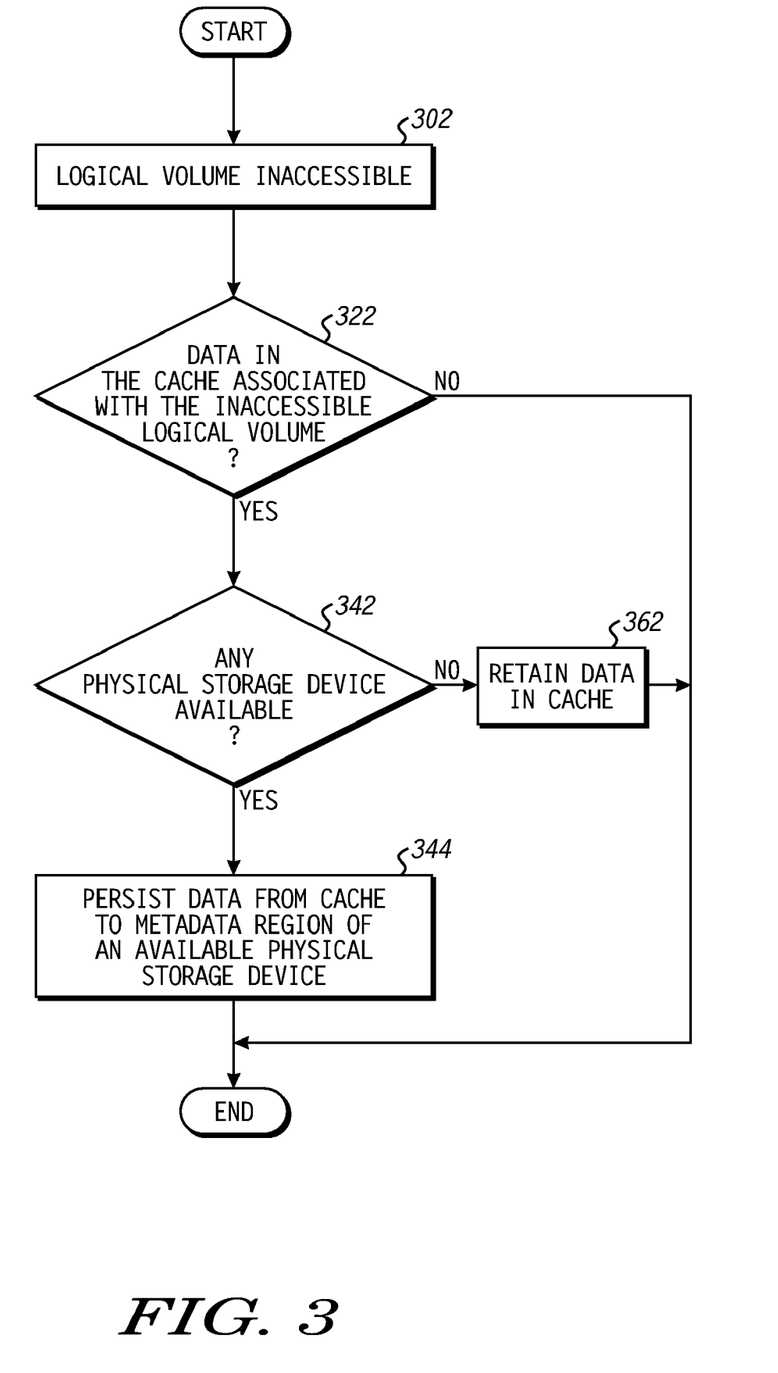
FIGS. 3 and 4 include a flow diagram of a method of temporarily persisting cached data when a logical volume becomes inaccessible in accordance to a one aspect of the disclosure.
Figure 4:
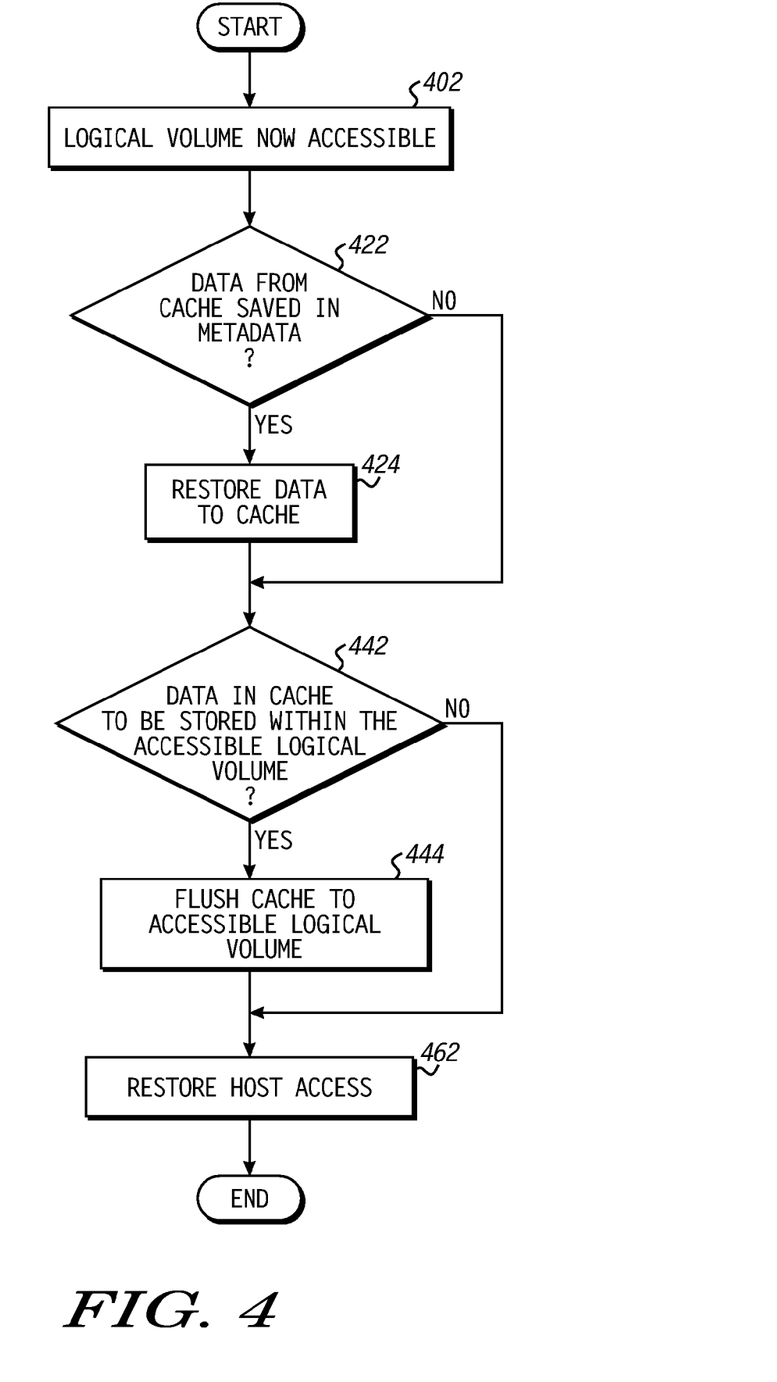

Attention is now directed to a method of using the information handling system 200 when the logical volume 216 becomes inaccessible and later becomes accessible again. FIGS. 3 and 4 include a flow diagram that illustrates an embodiment of the method. FIG. 3 is generally directed to handling data from a cache while the logical volume is inaccessible, and FIG. 4 is generally directed to restoring the logical volume 216 after the logical volume 216 later becomes accessible. The logic to perform the methods can be in hardware, software, or firmware within the LVM 208, the host system 202, or a combination thereof. In one embodiment, the logic can be in the form of a processor readable medium that includes code, wherein the code includes instructions for carrying out the one or more of the methods or one or more portions of the methods.

The method starts when the logical volume becomes inaccessible, at block 302 of FIG. 3. Examples of conditions that can cause a logical volume to become inaccessible have been previously described. In one embodiment, the determination that the logical volume 216 is inaccessible can be performed by the LVM module 210 or the controller 214. To simplify the description, the inaccessibility is related to a condition associated with the physical storage device 220 in this particular embodiment.

When the logical volume is inaccessible, a determination is made whether any data in the cache is associated with the inaccessible logical volume, at decision tree 322 in FIG. 3. The cache 212 may contain actual data that is to be persisted within the physical storage device 220; however, the logical volume 216 may have become inaccessible before the actual data could be persisted within the physical storage device 220. If the cache 212 does not have any data for the inaccessible logical volume ("No" branch of decision tree 322), the method ends.

Otherwise ("Yes" branch of decision tree 322), a determination is made whether any physical storage device is available, at decision tree 342. If no physical storage device is available ("No" branch from decision tree 342), the data will be retained in the cache, at block 362 of FIG. 3, and the method ends.

If a physical storage device is available, data can be persisted in the available physical storage device. The data includes the actual data and the corresponding metadata that includes the logical block address, the original physical storage device where the actual data were originally intended to be persisted, and the available physical storage device where the actual data is being persisted while the logical volume is inaccessible. Many options are available with respect to implementation details with respect to persisting data for the inaccessible logical volume that currently resides within the cache.

In one embodiment, the method can include persisting data from the cache to the metadata region of the available physical storage device, at block 344 in FIG. 3. In a particular embodiment, the data, including the actual data and metadata, can be persisted in the metadata regions of each available physical storage device (e.g., physical storage devices 224 and 226). In another particular embodiment, the data, including the actual data and metadata, can be persisted in the metadata region of one available physical storage device (e.g., physical storage device 224 or 226), rather than all available physical storage devices. In still another particular embodiment, the actual data can be persisted in the metadata region of one of the physical storage device, and the corresponding metadata can be persisted in each of the available physical storage devices. In a further embodiment, another reserved portion of the physical storage devices, such as a data recovery portion, can be used instead of the metadata portion for any of the foregoing embodiments. In still a further embodiment, both the data recovery and metadata portions can be used. For example, the actual data can be persisted within the data recovery portion of one or more of the available physical storage devices, and the metadata can be persisted within the metadata portion of one or more of the available physical storage devices. Other implementations are possible. After reading this specification, skilled artisans will appreciate that the method is flexible and can be tailored to their particular needs or desires.

The logical volume can later become accessible, at block 402 in FIG. 4. For example, a technician may have disconnected the physical storage device 220 from its power supply or disconnected a network connection between the physical storage device 220 and the LVM 208, which would cause the logical volume 216 to become inaccessible. The technician can reconnect the physical storage device 220 to its power supply or the LVM 208. Alternatively, a replacement physical storage device for the physical storage device 220 can be installed within the logical volume 216. The determination that the logical volume 216 is accessible can be made by the LVM module 210, the controller 214, or the replacement physical storage device or the particular physical storage device that caused the logical volume 216 to become inaccessible. If the controller 214 or the particular physical storage device makes the determination, information corresponding to such determination can be sent by the controller 214 or particular physical storage device and received by the LVM module 210. The logical volume 216 is now ready to be restored.

A determination can be made whether the data from the cache was saved in a reserved portion of a physical storage device. In one embodiment, the determination can be made whether the data from the cache was saved in a metadata portion of a physical storage device, at decision tree 422 in FIG. 4. In another embodiment, the determination can be made whether the data from the cache was saved in a data recovery portion of a physical storage device, and in still another embodiment, the determination can be made whether the data from the cache was saved in a combination of data recovery and metadata portions of one or more physical storage devices.

If the data was saved ("Yes" branch from decision tree 422), the method can include restoring the data to the cache, at block 424 in FIG. 4. Restoring the data to the cache can include reading the data, including the actual data and their corresponding metadata, from at least one of the physical storage devices where the data was temporarily saved when the logical volume 216 was inaccessible. In a particular embodiment, the data from the cache that was to be stored within the physical storage device 220 was stored within the physical storage device 224, physical storage device 226, another physical storage device within the logical volume 216, or any combination of physical storage devices within the logical volume 216. The data and corresponding metadata can be read from the appropriate physical storage device(s) and stored within the cache 212. In a particular embodiment, the LVM module 210 can determine that the data was to be persisted in the physical storage device 220 but was saved in another physical storage device until the logical volume 216 would become accessible. If the data was retained in the cache 212 while the logical volume 216 was inaccessible ("No" branch from decision tree 422), the cache does not need to be restored, and therefore, the activity in block 424 does not need to be performed.

Another determination is made whether the data in the cache is to be stored within the accessible logical volume, at decision tree 442 in FIG. 4. If the data is to be stored within the accessible logical volume, the method can include flushing the cache to the accessible logical volume, at block 444 of FIG. 4. For example, actual data that were to be stored within the logical volume 216 can now be persisted within the physical storage device where such actual data were intended to be stored (e.g., the physical storage device 220) or within a replacement physical storage device. The corresponding metadata can be persisted within the metadata portions of each physical storage device within the logical volume 216. In one embodiment where the physical storage device 220 was temporarily disconnected, the actual data can now be persisted within the physical storage device 220 or its replacement physical storage device. The corresponding metadata can be persisted within the metadata portions of all of the physical storage devices, including the physical storage devices 224 and 226, within the logical volume 216.

In another embodiment, no data in the cache is to be stored within the accessible logical volume ("No" branch from the decision tree 442). For example, the logical volume 216 may have been inaccessible for a very short time, and no write requests for data within the logical volume 216 may have received by the LVM 208. In this embodiment, no flushing of the cache is needed.

The method can further include restoring host access, at block 462 in FIG. 4. The restoration of access to the host system 202 may be performed by the LMV 208 or the host system itself 202. The information handling system can now perform memory operations using the logical volume 216, including reading data from and writing data to physical storage devices 220, 224, and 226 within the logical volume 216.

Many different types of organizations of the logical volumes can be used with the embodiments described herein. Logical volumes that do not have physical storage devices that are mirrored may be particularly well suited to the embodiments described herein. While all RAID levels can be used with the embodiments, RAID Levels 0, 1, 2, 4, 5, and 6 may be more robust when using the system and methods described herein.

Embodiments are also particularly useful for data recovery when the logical volume 216 becomes inaccessible and later becomes accessible. In one embodiment, the logical volume 216 may include many physical storage devices attached to the same chassis. A particular physical storage device, attached to the chassis, may need to be repaired or replaced. A technician may accidentally disconnect the power or network connection for a different physical storage device instead of the particular physical storage device that was to be repaired or replaced. The system and method described herein are more tolerant to such human errors, and therefore, the likelihood of losing data from such an occurrence is significantly reduced. An existing information handling system having a logical volume may be modified relatively easily, and may not require having to spend substantial amounts of money on new equipment.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a method of storing data within an information handling system can include providing the information handling system including a logical volume and a cache. The logical volume can include a first physical storage device and a second physical storage device, and the cache can include actual data that is to be persisted within the first physical storage device. The method can also include persisting the actual data within the second physical storage device that is different from the first physical storage device. The method can further include persisting the actual data within a third physical storage device after persisting the actual data within the second physical storage device, wherein the third physical storage device is part of the logical volume and is different from the second physical storage device.

In one embodiment of the first aspect, the first physical storage device and the third physical storage device are a same physical storage device, and in another embodiment, the first physical storage device and the third physical storage device are different physical storage devices. In still another embodiment, the method further includes determining that the logical volume is inaccessible before persisting the actual data within the second physical storage device, determining that the logical volume is accessible after persisting the actual data within the second physical storage device, and restoring the actual data to the cache after persisting the actual data within the second physical storage device and before persisting the actual data within the third physical storage device. In a particular embodiment, the method further includes restoring access to a host system.

In a further embodiment of the first aspect, persisting the actual data within the second physical storage device includes persisting the actual data within a reserved portion of the second physical storage device, wherein the reserved portion is not used for persisting actual data when the logical volume is accessible. In a particular embodiment, the reserved portion of the second physical storage device includes a metadata portion of the second physical storage device. In a more particular embodiment, the method further includes persisting the actual data within other metadata portions of other physical storage devices.

In still a further embodiment of the first aspect, the logical volume includes substantially all of the first and second physical storage devices. In yet a further embodiment, the logical volume includes only portions of the first and second physical storage devices. In another embodiment, the logical volume includes a redundant array of inexpensive disks. In a particular embodiment, the logical volume is organized to have a RAID Level of 0, 1, 2, 4, 5, or 6. In still another embodiment, the logical volume does not include actual data that is mirrored between at least two different physical storage devices when the logical volume is accessible. In yet another embodiment, the actual data has a size corresponding to a stripe, a line, or a block.

In a second aspect, an information handling system can include a logical volume including a first physical storage device and a second physical storage device that is different from the first physical storage device. The information handling system can further include a cache operable to temporarily store data that is to be persisted within the first physical storage device of the logical volume. The information handling system can further include a processor coupled to the logical volume and the cache, wherein the processor is operable to store the data into the cache, determine whether the logical volume is inaccessible, persist the data into the second physical storage device in response to determining that the logical volume is inaccessible, and restore the logical volume.

In one embodiment of the second aspect, restore the logical volume includes persist the data within the first physical storage device after the logical volume becomes accessible after being inaccessible. In another embodiment, restore the logical volume includes persist the data within a third physical storage device after the logical volume becomes accessible, wherein the third physical storage device is part of the logical volume and is different from the first physical storage device and the second physical storage device.

In a further embodiment of the second aspect, the logical volume includes other physical storage devices, and the processor is further operable to persist the data into each of the other physical storage devices that are available while the logical volume is inaccessible. Restore the logical volume includes persist actual data within the first physical storage device, and persist corresponding metadata into each of the first, second, and other physical storage device within the logical volume. In a particular embodiment, restore the logical volume further includes restore the data to the cache from the second physical storage device. In still a further embodiment, the processor is further operable to restore access to a host system.

After reading this specification, the functionality or performance of the methods described herein can be implemented in hardware, firmware, software, or any combination thereof. Further, methods described herein can be performed automatically; however, a portion of the method can be performed manually if needed or desired.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of storing data within an information handling system comprising:
    providing the information handling system including a logical volume and a cache, wherein the logical volume includes a first physical storage device and a second physical storage device, and the cache includes actual data that is to be persisted within the first physical storage device;
    persisting the actual data within the second physical storage device that is different from the first physical storage device;
    persisting the actual data within a third physical storage device after persisting the actual data within the second physical storage device, wherein the third physical storage device is part of the logical volume and is different from the second physical storage device;
    determining that the logical volume is inaccessible before persisting the actual data within the second physical storage device;
    determining that the logical volume is accessible after persisting the actual data within the second physical storage device; and
    restoring the actual data to the cache after persisting the actual data within the second physical storage device and before persisting the actual data within the third physical storage device.

2. The method of claim 1, wherein the first physical storage device and the third physical storage device are different physical storage devices.

3. The method of claim 1, further comprising restoring access to a host system.

4. The method of claim 1, wherein persisting the actual data within the second physical storage device comprises persisting the actual data within a reserved portion of the second physical storage device, wherein the reserved portion is not used for persisting actual data when the logical volume is accessible.

5. The method of claim 4, wherein the reserved portion of the second physical storage device comprises a metadata portion of the second physical storage device.

6. The method of claim 5, further comprising persisting the actual data within other metadata portions of other physical storage devices.

7. The method of claim 1, wherein the logical volume comprises substantially all of the first and second physical storage devices.

8. The method of claim 1, wherein the logical volume comprises only portions of the first and second physical storage devices.

9. The method of claim 1, wherein the logical volume comprises a redundant array of inexpensive disks.

10. The method of claim 9, wherein the logical volume is organized to have a redundant array of inexpensive disks Level of 0, 1, 2, 4, 5, or 6.

11. The method of claim 1, wherein the logical volume does not include actual data that are mirrored between at least two different physical storage devices when the logical volume is accessible.

12. The method of claim 1, wherein the actual data has a size corresponding to a stripe, a line, or a block.

13. An information handling system comprising:
    a logical volume including a first physical storage device and a second physical storage device that is different from the first physical storage device;
    a cache operable to temporarily store actual data that is to be persisted within the first physical storage device of the logical volume; and
    a processor coupled to the logical volume and the cache, wherein the processor is operable to:
        store the actual data into the cache;
        persist the actual data within the second physical storage device;
        persist the actual data within a third physical storage device after persisting the actual data within the second physical storage device, wherein the third physical storage device is part of the logical volume and is different from the second physical storage device;
        determine that the logical volume is inaccessible before persisting the actual data within the second physical storage device;
        determine that the logical volume is accessible after persisting the actual data within the second physical storage device; and
        restore the actual data to the cache after persisting the actual data within the second physical storage device and before persisting the actual data within the third physical storage device.

* * * * *